US009716462B2

(12) United States Patent
Stauder et al.

(10) Patent No.: US 9,716,462 B2
(45) Date of Patent: Jul. 25, 2017

(54) METHOD FOR ACTUATING A BRUSHLESS MOTOR

(71) Applicant: Continental Teves AG & Co. oHG, Frankfurt (DE)

(72) Inventors: Peter Stauder, Mainz (DE); Christian Östreich, Gründau (DE); Tom Kaufmann, Ippenschied (DE); Achim Netz, Rodgau (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/029,010

(22) PCT Filed: Oct. 9, 2014

(86) PCT No.: PCT/EP2014/071657
§ 371 (c)(1),
(2) Date: Apr. 13, 2016

(87) PCT Pub. No.: WO2015/058969
PCT Pub. Date: Apr. 30, 2015

(65) Prior Publication Data
US 2016/0261221 A1    Sep. 8, 2016

(30) Foreign Application Priority Data
Oct. 22, 2013  (DE) .................. 10 2013 221 433

(51) Int. Cl.
*H02P 29/00* (2016.01)
*H02M 7/5395* (2006.01)
(Continued)

(52) U.S. Cl.
CPC ...... *H02P 29/0038* (2013.01); *H02M 7/5395* (2013.01); *H02P 6/14* (2013.01);
(Continued)

(58) Field of Classification Search
CPC .................................................. H02P 29/0038
(Continued)

(56) References Cited

U.S. PATENT DOCUMENTS 6,023,136 A * 2/2000 Pinewski ............ B60L 11/1803
                                                            318/400.02
6,069,808 A * 5/2000 Panahi ............... H02M 7/53875
                                                            363/98
(Continued)

FOREIGN PATENT DOCUMENTS

DE         10393516      10/2005
DE       102008003299     7/2009
(Continued)

OTHER PUBLICATIONS

German Search Report for German Application No. 10 2013 221 433.2 mailed Dec. 9, 2013, including partial translation.
(Continued)

*Primary Examiner* — David S Luo
(74) *Attorney, Agent, or Firm* — RatnerPrestia

(57) ABSTRACT

A method for operating an electronically commutated synchronous machine, having a stator with at least two, in particular three, phase windings and a rotor having at least one permanent magnet. A control factor is determined periodically for each phase winding. The time periods during which an upper and lower supply voltage is applied to the phase winding are determined based on the control factor. The electronically commutated synchronous machine is actuated according to space vector modulation. Zero vectors are applied to the phase windings at the beginning and/or end of a period for a switch-off duration. All switches connected to the upper supply voltage or all switches connected to the lower supply voltage are on. The selection of the zero vector is performed in accordance with the phase winding with the greatest, in magnitude, deviation from the (Continued)

US 9,716,462 B2

Page 2 average control factor. As disclosed is an actuation circuit and the use thereof.

12 Claims, 1 Drawing Sheet

(51) Int. Cl.
| | |
|---|---|
| H02P 6/14 | (2016.01) |
| H02P 21/04 | (2006.01) |
| H02P 27/08 | (2006.01) |
| H02P 29/50 | (2016.01) |
| F16D 65/14 | (2006.01) |
| F16D 121/24 | (2012.01) |

(52) U.S. Cl.
CPC ............ *H02P 21/04* (2013.01); *H02P 27/085* (2013.01); *H02P 29/50* (2016.02); *F16D 65/14* (2013.01); *F16D 2121/24* (2013.01)

(58) Field of Classification Search
USPC .................. 318/400.27, 400.26, 400.01, 700
See application file for complete search history.

(56) References Cited

U.S. PATENT DOCUMENTS

| 6,819,078 B2 | 11/2004 | Ho |
| 8,487,461 B2 | 7/2013 | Engelhardt |
| 8,847,541 B2 | 9/2014 | Mizuguchi |
| 2012/0194108 A1 | 8/2012 | Kasaoka |
| 2015/0016170 A1 | 1/2015 | Olarescu |

FOREIGN PATENT DOCUMENTS

| DE | 102009049055 | 4/2011 |
| DE | 102012204058 | 9/2012 |
| DE | 112010003976 | 1/2013 |
| EP | 1596491 | 11/2005 |
| EP | 2634906 | 9/2013 |
| WO | 2013079198 | 6/2013 |

OTHER PUBLICATIONS

Hiti, S., et al., "Zero vector modulation method for voltage source inverter operating near zero output frequency," Oct. 3-7, 2004, vol. 1, pp. 171-176, General Motors Advanced Technology Center, Industry Applications Conference 2004, 39th IAS Annual Mtg., Conference Record of the 2004 IEEE.
International Search Report for International Application No. PCT/EP2014/071657 mailed Jan. 23, 2015.
Lock, A.S., et al., "One cycle-control method for obtaining discontinuous PWM strategies to control a three-phase rectifier," Nov. 8-10, 2010, pp. 1-6, 2010 9th IEEE/IAS International Conference on Industry Applications.
Written Opinion of the International Searching Authority for International Application No. PCT/EP2014/071657 mailed Jan. 23, 2015.

* cited by examiner

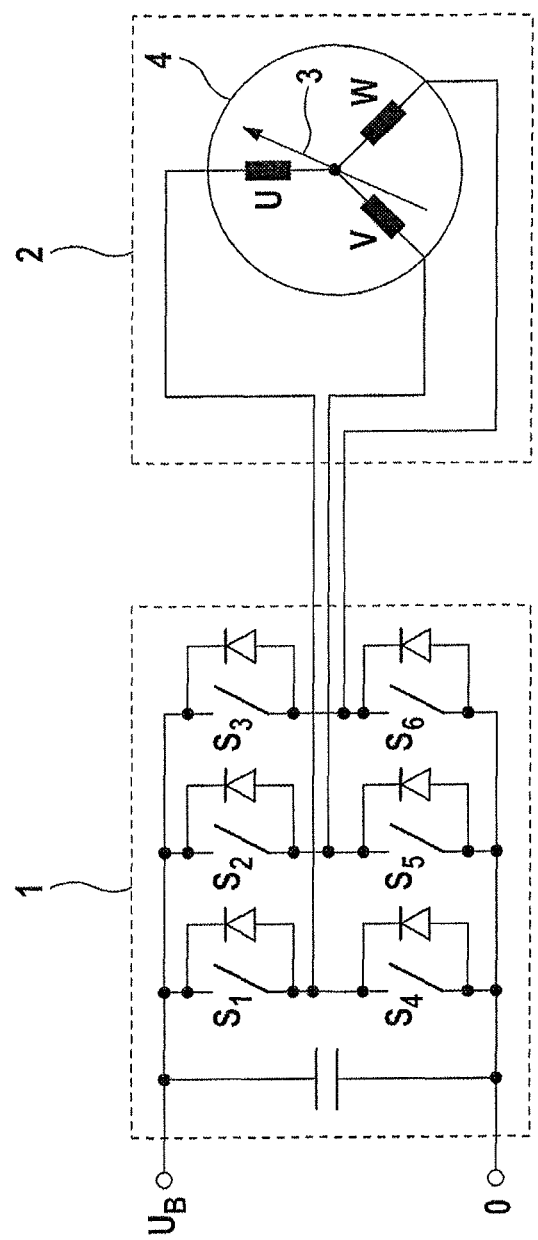

METHOD FOR ACTUATING A BRUSHLESS MOTOR

CROSS REFERENCE TO RELATED APPLICATIONS

This application is the U.S. National Phase application of PCT International Application No. PCT/EP2014/071657, filed Oct. 9, 2014, which claims priority to German Patent Application No. 10 2013 221 433.2, filed Oct. 22, 2013, the contents of such applications being incorporated by reference herein.

FIELD OF THE INVENTION

The invention relates to a method for operating an electronically commutated synchronous machine and a control circuit for an electronically commutated synchronous machine and also the application of said control circuit.

BACKGROUND OF THE INVENTION

Electronically commutated, permanently-excited synchronous machines, also known as brushless motors, comprise a stator having at least two, in particular three, phase windings, and a rotor having at least one pole pair that is arranged perpendicular with respect to the axis of rotation, said pole pair being formed by means of one or multiple permanent magnets that are arranged in or on the rotor. A brushless motor is supplied with current by way of a control circuit, in which each phase winding is allocated an upper and a lower switch and said switches can influence each phase winding with an upper or a lower supply voltage. If one or multiple phase windings are energized, the rotor thus aligns itself in the magnetic field that occurs. It is necessary to determine the rotor position in order to control the brushless motor in an expedient manner, and said rotor position is determined by means of a resolver or rotary encoder.

Expediently, it is possible to perform a closed-loop control of the currents by means of the phase windings in a coordinate system that is fixed to the rotor, wherein a d-axis in the direction of the rotor magnetic field and a q-axis that stands at 90° (electrical angle, linked to the mechanical angle by way of the pole pair number) to this perpendicular d-axis are considered. A current that flows in the q-axis direction determines (in a motor without reluctance torque) the torque that is output and is therefore described as the torque-forming current ($i_q$). In order to achieve high rotational speeds, it is possible to perform a field-weakening closed-loop control process in which a current that also flows in the d-axis direction is predetermined. The coordinate system that is fixed to the rotor rotates with respect to the stator, therefore the phase currents or corresponding phase voltages that are to be applied are determined by way of a suitable transformation with reference to the rotor position. It is also possible to predetermine phase voltages by way of alternative methods such as for example an open-loop control with the aid of values that are stored in a table. In accordance with the phase voltages that are determined, periodic control factors and also time durations that correspond to said control factors are determined in a pulse width modulation (PWM), such as in particular a space vector modulation, during which the respective phase windings are connected to the upper or the lower supply voltage by means of the control circuit.

Switching effects in the inverter of the control circuit are a relevant source for grid-bound interferences that can produce malfunctions in electronic circuits by way of the on board network. Both interferences in the range of switching frequency as well as their harmonic waves in the case of multiples of the switching frequency are generated by means of switching power semiconductors that control the phase windings. In terms of the electromagnetic compatibility (EMC), it is just as important in the case of electric motors as consumers with a relatively high electrical power to minimize the output of interference pulses. For this reason, a centered, multiphase PWM is frequently performed that produces a broader frequency spectrum with respect to a flank-centered PWM since the input and output switching flanks in the case of a rotating motor are continuously altered in relation to the fixed time pattern that is provided by means of the PWM base frequency. The associated frequency spectrum of the interference pulses that are output is consequently smoothed and the amplitude values of the switching frequency and harmonic waves that are determined are therefore smaller.

SUMMARY OF THE INVENTION

An aspect of the present invention is a further improvement of the electromagnetic compatibility.

A method for operating an electronically commutated synchronous machine is therefore provided, said machine comprising a stator having at least two, in particular three, phase windings and a rotor that comprises at least one permanent magnet, said machine having a control circuit that comprises at least two switches that are allocated to a phase winding, wherein a pulse control factor is determined periodically for each individual phase winding and reference is made to said pulse control factor in order to determine the time periods during which the phase winding is influenced by way of the allocated switch either with an upper or with a lower supply voltage. In accordance with the invention, the electronically commutated synchronous machine is controlled in accordance with a space vector modulation method in which at the beginning and/or end of a period for a switch-off time duration zero vectors are applied to the phase windings, wherein in each case either all the switches that are connected to the upper supply voltage or all the switches that are connected to the lower supply voltage conduct, and wherein the zero vector is selected, in other words whether the conducting connection is produced with the upper or the lower supply voltage, in accordance with the phase winding with the largest deviation from the mean pulse control factor that expediently corresponds to the mean value between the upper supply voltage and the lower supply voltage. In lieu of a direct consideration of the pulse control factor, it can be possible to take into consideration an in particular proportional variable, such as for example a current or voltage value, said proportional variable being correlated with the pulse control factor.

By virtue of the fact that a phase winding is connected to the same supply voltage during an entire period, the number of switching procedures and consequently also the amplitudes of the interference frequencies that are output are reduced. This results in an improved electromagnetic compatibility. Furthermore, the method has the advantage of reducing the switching times of the semiconductor and consequently of reducing the thermal output.

It is preferred that the switch-off time is changed by a pseudo-random value if a predetermined condition is fulfilled.

This renders it possible in particular in the case of a motor that is at a standstill or a motor that is rotating slowly to broaden the frequency spectrum that is output and as a consequence to reduce the averaged amplitude values of a switching frequency and harmonic waves. As a consequence, the electromagnetic compatibility can be improved over the entire rotational speed both in the case of a motor at a standstill as well as a rotating motor.

A motor that is at a standstill or a motor that is rotating slowly can be expediently identified by virtue of the fact that a rotational speed of the electronically commutated synchronous machine is determined and is compared with a rotational speed threshold value, wherein the predetermined condition is fulfilled and the switch-off time period is altered by a pseudo-random value if the rotational speed that is determined is less than the rotational speed threshold value.

Alternatively, the pulse control factors of the individual phase windings can preferably be compared, wherein a maximal pulse control deviation is determined as a difference between the largest and the smallest pulse control factor, wherein the predetermined condition is fulfilled and the switch-off time period is altered by a pseudo-random value if the pulse control deviation is below a predetermined deviation threshold value.

The mentioned predetermined conditions have the advantage that only variables are considered that are mostly required or known for the operation of the motor. Consequently, it is possible to achieve the method with little additional computing time and without additional sensors.

It is advantageous if the pseudo-random value is calculated with the aid of a mathematical function and/or is determined with the aid of a stored table and/or is selected in accordance with the lowest value bit of an analog-digital converter that is arranged in or connected to the control circuit. By way of example, deterministic functions are known from cryptography, said functions generating with low computing time pseudo-random values with sufficiently long periods. In principle, the noise of a component that is present in the control circuit, by way of example of an analog-digital converter, can also be used for determining pseudo-random or random values.

In particular, in relation to selecting the zero vector, a check is expediently performed as to whether the pulse control factor for the phase winding having the largest deviation from the mean pulse control factor exceeds an upper pulse control threshold value or is below a lower pulse control threshold value, wherein the upper pulse control threshold value is greater than the lower control threshold value, wherein the corresponding phase winding is connected to the upper supply voltage during an entire period if the upper pulse control factor has been exceeded, and said phase winding is connected to the lower supply voltage if the pulse control factor is below the lower pulse control threshold.

It is advantageous if either only a comparison with the upper threshold value or only a comparison with the lower threshold value takes place, wherein in other words either only one connection of the corresponding phase winding to the upper supply voltage or only one connection of the corresponding phase winding with the lower supply voltage can occur. Consequently, on the one hand a particularly low computing capacity is required, on the other hand, the selection of a "preferred direction" can be advantageous depending upon the power semiconductor that is used in the control circuit.

Furthermore, an aspect of the invention relates to a control circuit for an electronically commutated synchronous machine that comprises a stator having at least two, in particular three, phase windings and a rotor that comprises at least one permanent magnet, said control circuit comprising in each case two switches that are allocated to a phase winding, said switches being connected to an upper or a lower supply voltage. In accordance with the invention, the control circuit comprises a computing unit, in particular a microcontroller that controls the switches in accordance with a method in accordance with the invention. The microcontroller comprises in particular a non-volatile storage device and instructions for performing the method are stored in said storage device.

In accordance with a preferred embodiment of the invention, at least one switch is embodied as a Sense-FET in which a measuring current that is proportional to the connected power current can be tapped at an additional connection of the semiconductor switch, and that the computing unit comprises at least one analog-digital converter that determines across a measuring resistor the measuring current of a connected Sense-FET. It is particularly preferred that all the switches are embodied as Sense-FETs since this simplifies a current measurement in the case of a low control factor.

In addition, an aspect of the invention relates to the use of a control circuit in accordance with the invention in an electronic control device for a braking system of a motor vehicle, wherein the control circuit is in particular connected to an electrohydraulic actuator. By way of example, in the case of the vehicle stopping on an incline, it is possible in a brake system that a significant current is flowing through the brushless motor while said motor is not rotating. It is then possible by means of selecting the suitable zero vector and in particular altering the switch-off time period by a pseudo-random value to clearly reduce the amplitude of the interference frequencies that are output.

BRIEF DESCRIPTION OF THE DRAWINGS

Further preferred embodiments are evident in the dependent claims and the description hereinunder of an exemplary embodiment with reference to a FIGURE.
In the FIGURE
The FIGURE illustrates a brushless motor having a control circuit.

DETAILED DESCRIPTION OF THE PREFERRED EMBODIMENTS

The FIGURE illustrates an exemplary electrical machine 2 that is supplied with energy by way of a control circuit 1. The stator of the electrical machine 2 comprises in the illustrated example three phase windings U, V and W that are arranged in a star connected manner and can be connected by way of allocated switches to an upper supply voltage $U_B$ or a lower supply voltage 0 (or ground). The schematically indicated rotor 3 comprises at least one pole pair that is embodied by means of permanent magnets. A rotor position sensor and a control device are not illustrated, said control device in particular comprising a microprocessor that controls the switches.

The phase winding U can be connected to the upper supply voltage by way of switch $S_1$ and can be connected to ground by way of switch $S_4$. Accordingly, the switches $S_2$ and $S_5$ are allocated to the phase winding V and also the switches $S_3$ and $S_6$ are allocated to the phase winding W. The switches can preferably be embodied as field effect transistors (FET) and can also comprise a parallel-connected diode such as is illustrated in the FIGURE. It is expedient for the control procedure if each phase winding (or the associated switch) comprises a current measuring element since then it is possible to measure the current across the individual phase windings independently of the control factor. This can occur by way of example by virtue of the fact that the switches are embodied as Sense-FETs that output a measuring current at an additional connector, said measuring current being proportional to the switching current that is flowing and said measuring current can be determined for example by way of a reference resistance and an analog-digital converter.

The phase windings are supplied with current or voltage by way of a space vector modulation. If the dead times that are required owing to the undesired behavior of the switch are ignored, then either switch $S_1$ is opened and $S_4$ is closed or $S_1$ is closed and $S_4$ is opened at an arbitrary point in time in the case of the phase winding U (in the case of the other phase windings, this applies accordingly for the allocated switches). In each case, a base vector is allocated to the various switching states of the control circuit, wherein 6 active base vectors cause a flow of current across at least one phase winding and 2 switching states correspond to zero vectors. In the case of the first zero vector, for each phase winding the switch for connecting to the upper supply voltage is closed so that voltage is not supplied; this applies accordingly in the case of the second zero vector for the switch to ground. An arbitrary voltage vector can be set in the case of the suitable selection of the time period by means of the two adjacent active base vectors and one or the two zero vectors.

Consequently, so as to control the electrical machine, a suitable voltage vector can be determined and converted in a centered, multiphase pulse width modulation. A period expediently begins and ends with a zero vector that prevails for a time duration $T_0$. In a symmetric manner in relation to the periods, a first active base vector is applied for a time duration $T_1$ and a second active base vector is applied for a time duration $T_2$. It is necessary for the sum of the time durations $2*T_0+2*T_1+2*T_2$ to correspond to the period durations. In particular in the case of low voltages that are to be applied or a small control factor, it can also be possible to apply a zero vector both at the beginning and end as well as in the middle of a period.

The selection of the zero vector is arbitrary. If a connection to the upper supply voltage is to be applied for a phase winding with the exception of the zero vector time duration (s) for the entire period, expediently only the first zero vector is applied during this period. It is possible to identify this with reference to a comparison of the pulse control factor with a threshold value or with reference to considering the voltage and voltage angle.

In the case of small pulse control factors and electrical machines that are rotating slowly or are at a standstill, the time durations in which a zero vector is applied forms a large proportion of the period. The switch-on times of the individual base vectors or the switch-on times of the individual phase windings are therefore expediently increased or decreased by a pseudo-random value. A pseudo-random value can be determined from a deterministic function if this provides a sufficient number of different values before a value is repeated. Since the control device in many cases comprises at least one analog-digital converter, it is possible to use the noise of this component in that the random value is determined from the lowest value bit of the converter. Owing to the resulting stochastic offset, the switching frequency deviates by (pseudo) random values from the base frequency of the pulse width modulation, whereby the spectrum of the interferences that are output is broadened and the averaged amplitudes are reduced in the case of a frequency that is being considered.

The method in accordance with the invention reduces the output of interferences and can also lead to a reduced heat input.

The invention claimed is:

1. A method for operating an electronically commutated synchronous machine that comprises a stator having at least two, phase windings and a rotor that comprises at least one permanent magnet, said machine also comprising a control circuit that comprises at least two switches that are allocated to a phase winding, the method comprising:
   determining a pulse control factor periodically for each individual phase winding;
   determining, based on said pulse control factor, time periods during which the phase winding is influenced by way of the allocated switch either with an upper supply voltage or with a lower supply voltage; and
   controlling the electronically commutated synchronous machine in accordance with a method of space vector modulation in which at the beginning and/or end of a period zero vectors are applied to the phase windings for a switch-off time duration,
   wherein in each case either all the switches that are connected to the upper supply voltage or all the switches that are connected to the lower supply voltage conduct, and the zero vector is selected in accordance with the phase winding having the greatest deviation from the mean pulse control factor, said mean pulse control factor corresponding to a mean value between the upper supply voltage and lower supply voltage.

2. The method as claimed in claim 1, wherein the switch-off time duration is altered by a pseudo-random value if a predetermined condition is fulfilled.

3. The method as claimed in claim 2, wherein a rotational speed of the electronically commutated synchronous machine is determined and is compared with a rotational speed threshold value, and the predetermined condition is fulfilled and the switch-off time duration is altered by a pseudo-random value if the rotational speed that is determined is smaller than the rotational speed threshold value.

4. The method as claimed in claim 3, wherein the pulse control factor of the individual phase windings are compared, wherein a maximal pulse control deviation is determined as a difference between the largest and the smallest pulse control factor, and the predetermined condition is fulfilled and the switch-off period is altered by a pseudo-random value if the pulse control deviation is below a predetermined deviation threshold value.

5. The method as claimed in claim 2, wherein the pulse control factor of the individual phase windings are compared, wherein a maximal pulse control deviation is determined as a difference between the largest and the smallest pulse control factor, and the predetermined condition is fulfilled and the switch-off period is altered by a pseudo-random value if the pulse control deviation is below a predetermined deviation threshold value.

6. The method as claimed in claim 2, wherein the pseudo-random value is at least one of calculated with the aid of a mathematic function, determined with the aid of a stored table, and determined in accordance with the lowest value bit of an analog-digital converter that is arranged in the pulse control circuit or is connected to said circuit.

7. The method as claimed in claim 1, wherein a check is performed as to whether the pulse control factor for the phase winding having the greatest deviation from the mean pulse control factor exceeds an upper pulse control threshold value or is below a lower pulse control threshold value, wherein the upper pulse control threshold value is greater than the lower pulse control threshold value, wherein the corresponding phase winding is connected during an entire period to the upper supply voltage if the upper control factor has been exceeded, and is connected to the lower supply voltage if the pulse control factor is below the lower control factor.

8. The method as claimed in claim 7, wherein either only one comparison between the upper threshold value or only one comparison with the lower threshold value is performed, wherein either only one connection of the corresponding phase winding to the upper supply voltage or only one connection of the corresponding phase winding to the lower supply voltage can occur.

9. An application of a control circuit as claimed in claim 8 in an electronic control device for a brake system of a motor vehicle, wherein the control circuit is connected to an electrohydraulic actuator.

10. A control circuit for an electronically commutated synchronous machine comprising:

a stator having at least two, phase windings; and
a rotor that comprises at least one permanent magnet,
said control circuit comprising in each case two switches that are allocated in each case to a phase winding, said switches being connected to an upper supply voltage or a lower supply voltage, by a microcontroller that controls the switches in accordance with a method according to claim 1.

11. The control circuit as claimed in claim 10, wherein at least one switch is embodied as a Sense-FET in which at, an additional connector of the semiconductor switch, it is possible to tap a measuring current that is proportional to the power current that is connected, and that the computing unit comprises at least one analog-digital converter that determines the measuring current of a connected Sense-FET across a measuring resistor.

12. An application of a control circuit as claimed in claim 10 in an electronic control device for a brake system of a motor vehicle, wherein the control circuit is connected to an electrohydraulic actuator.

* * * * *